L. WIGHT & O. G. EWINGS.
GRAIN-DRILL.
No. 173,380.  Patented Feb. 8, 1876.
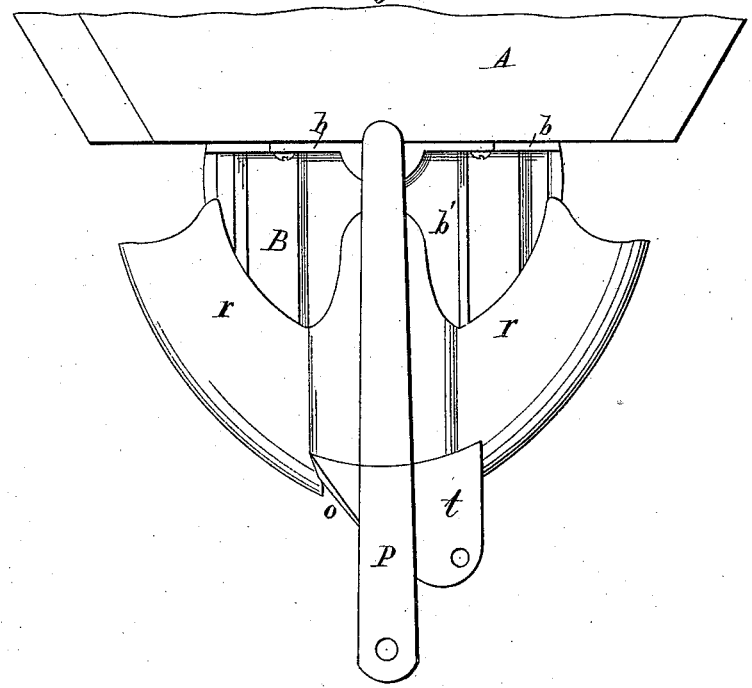
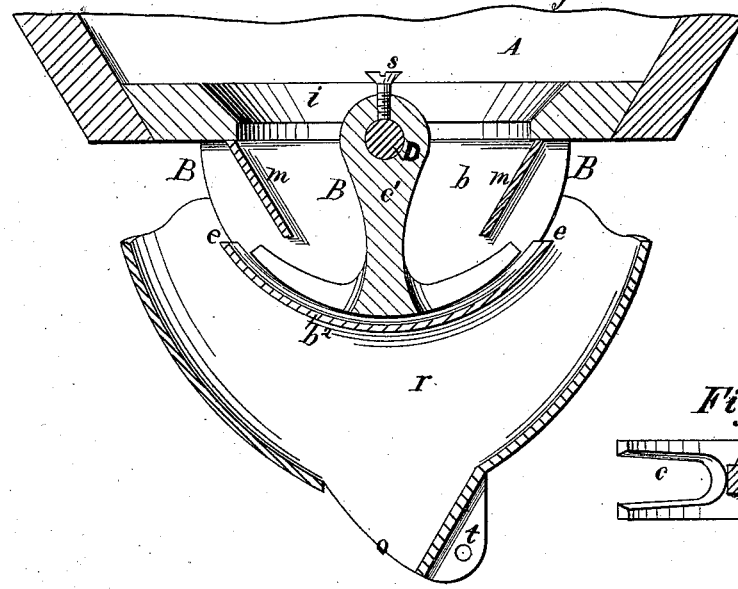
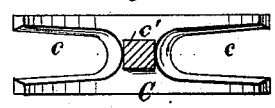

UNITED STATES PATENT OFFICE.

LYMAN WIGHT AND ORISON G. EWINGS, OF WHITEWATER, WISCONSIN.

IMPROVEMENT IN GRAIN-DRILLS.

Specification forming part of Letters Patent No. 173,380, dated February 8, 1876; application filed June 28, 1875.

*To all whom it may concern:*

Be it known that we, LYMAN WIGHT and ORISON G. EWINGS, both of Whitewater, in the county of Walworth and State of Wisconsin, have invented certain new and useful Improvements in Grain-Drills and Broadcast-Seeders; and we do hereby declare the following to be a full, clear, and exact description of the same, reference being had to the accompanying drawings, forming part of this specification, in which—

Figure 1 represents a side elevation, Fig. 2 a vertical section, Fig. 3 a top-plan view, of the reciprocating instrument, showing a cross-section of the vertical stem thereof.

Similar letters of reference in the accompanying drawings denote the same parts.

This invention relates to that class of grain-drills, broadcast-seeders, and other machines of a similar character, in which the seed is caused to run from the seed-box into an auxiliary bowl or vessel, in which works an oscillating instrument that by its alternate movements pushes the requisite quantities of seed up over the edge of the bowl and discharges them therefrom; and the invention consists in an improved construction of the various parts, as we will now proceed to set forth.

In the drawings, A is the seed-box, from which the seed runs freely by its own gravity into an auxiliary bowl or open receptacle, B. Within the receptacle B is the oscillating or reciprocating instrument C, which, at every movement in one or both directions, pushes a small quantity of the seed up over the edge of the receptacle, leaving it to drop through a tube, or over a spreader, as the case may be, to the ground.

The speed and limit of movement of the oscillating instrument are intended to be readily adjustable by any suitable means.

For the ordinary grain-drill we prefer to construct the auxiliary bowl in one casting, with suitable flanges $b$, through which it can be screwed to the under side of the seed-box, its end plates $b^1$ being nearly circular, and connected together by a concave bottom plate, $b^2$, over the edges of which, at $e\ e$, the grain can escape to the ground, and to inclose the lower end of this bowl in a funnel-shaped casting, $r$, secured to the end plates $b^1$ by rivets, for the purpose of receiving the grain as it falls over the edges $e\ e$, and guiding it to the mouth of the drill-tubes at $o$, said drill-tubes being attached to the casting $r$ at $t$. Two inclined plates, $m$, are arranged in the bowl B, so as to extend from the bottom of the seed-box down to or below the level of the edges $e\ e$, and thereby prevent the accidental escape and loss of the seed. The oscillating instrument is constructed in a suitable curve, to fit the concave $b^2$, and with bifurcated or notched ends $c\ c$, which serve to hedge in the seed that is to be discharged, prevent its lateral escape, and compel it to move directly forward, and drop over the edges $e\ e$. This curved and notched or pronged head is connected by a stem, $c'$, to a rock-shaft, D, extending the entire length of the seed-box, and operated by a pitman, P, connected to any suitable driving mechanism.

For the purpose of giving the instrument C a greater or less movement, as may be desired, the pitman may be connected to an adjustable wrist-pin on the driving-wheel.

The stem $c'$ may be attached to the rock-shaft by any means ordinarily employed for such purposes—as, for example, by a set-screw, $s$.

The movements of the shaft, set-screw, and oscillating instrument C serve to agitate the seed, and cause it to feed down uniformly and continuously through the opening $i$ into the bowl B.

It will be observed that the form and construction of this apparatus are very simple, rendering it inexpensive to manufacture, durable, and not liable to give trouble by getting out of order. The openings, through which the seed is fed, remain constantly the same, and yet the throw of the seed-discharging instrument can be varied, as desired, so as to regulate perfectly the feed of the grain or other seed. Ordinarily, for grain-drilling, the adjustment should be such as to cause one throw of the discharging-lever while the machine is moving forward over the ground about nine inches; but this adjustment may be varied, according to circumstances.

We claim as our invention—

1. In a seeding-machine, having a seed-box and an auxiliary seed-receptacle, we claim the oscillating seed-discharging instrument, having its operative extremities bifurcated, substantially as and for the purposes set forth.

2. In a seeding-machine, we claim the auxiliary bowl B, having the end plates $b^1$, the curved bottom $b^2$, the inclined plates $m\ m$, and the passage for the seed under the plates $m$ and over the edges $e\ e$, substantially as and for the purposes set forth.

3. In a seeding-machine, we claim the combination of the auxiliary bowl B, having the seed-passages under the plates $m$, and up over the edges $e\ e$, with the surrounding receiver $r$, adapted to receive the seed and guide it to the end of the drill-tubes, substantially as and for the purposes set forth.

LYMAN WIGHT.
ORISON G. EWINGS.

Witnesses:
GEO. N. STEELE,
N. H. STEVENSON.